A. CAMPBELL.
HARVESTER.

No. 187,809. Patented Feb. 27, 1877.

UNITED STATES PATENT OFFICE.

ANDREW CAMPBELL, OF NEBRASKA CITY, NEBRASKA.

IMPROVEMENT IN HARVESTERS.

Specification forming part of Letters Patent No. 187,809, dated February 27, 1877; application filed August 14, 1876.

*To all whom it may concern:*

Figure 1:
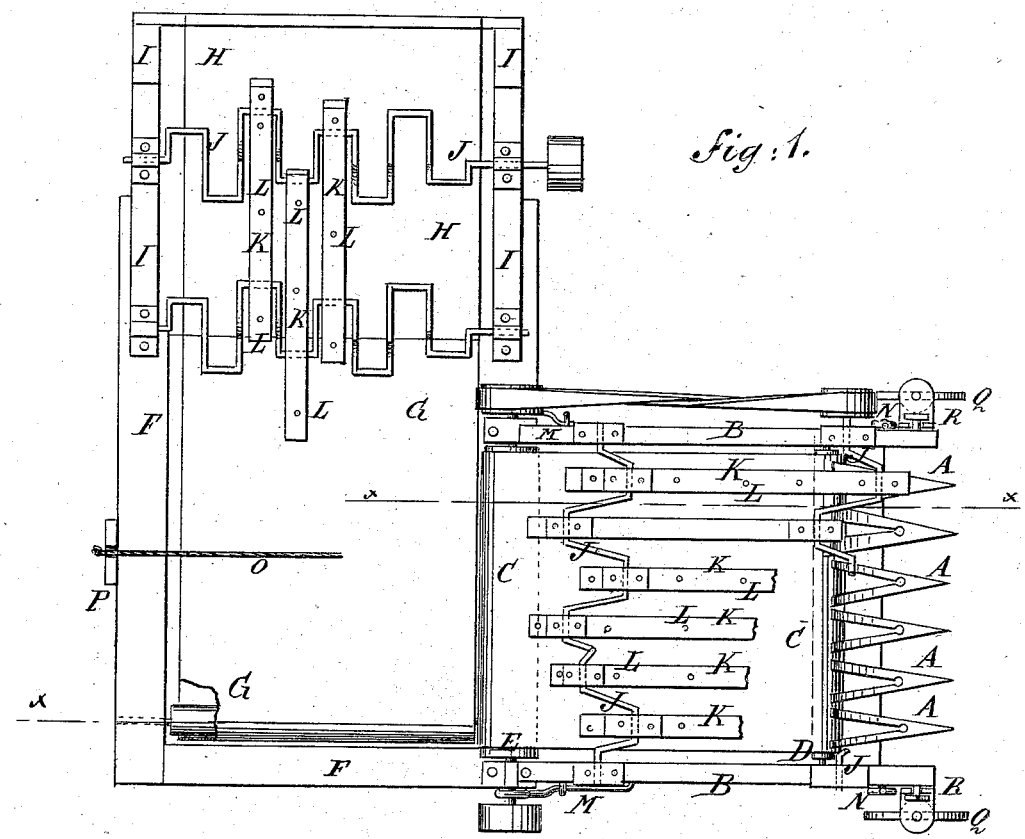
Figure 2:
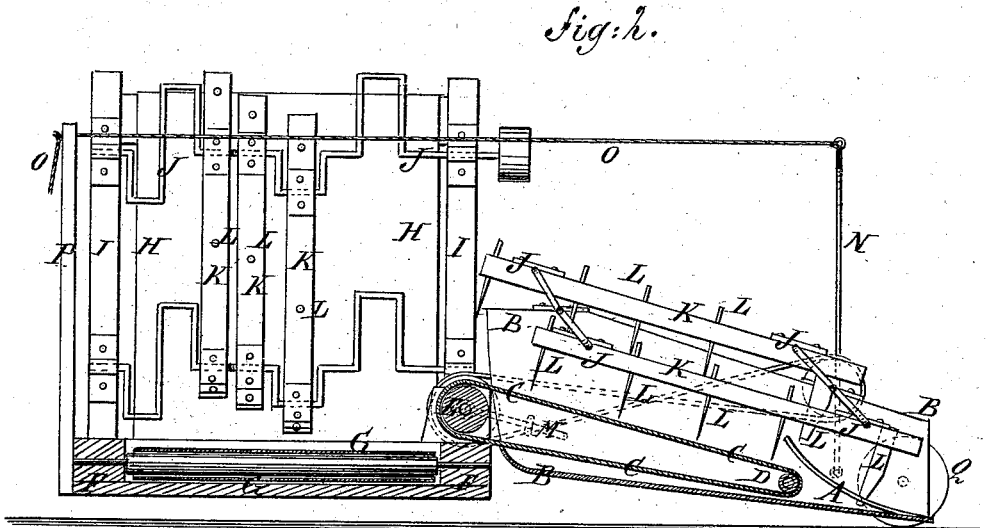

Be it known that I, ANDREW CAMPBELL, of Nebraska City, in the county of Otoe and State of Nebraska, have invented a new and useful Improvement in Raking Attachment for Grain and Hay Gatherers, Harvesters, &c., of which the following is a specification:

Figure 1 is a top view of a part of a grain-gatherer to which my improvement has been applied. Fig. 2 is a section of the same, taken through the line $x\ x\ x$, Fig. 1.

Similar letters of reference indicate corresponding parts.

The invention consists in two special combinations—one for the fingers and bars, the latter with sharp-edged front tooth, and another combination of the reciprocating heads, having depending teeth, cutters, and cutter-guards, with endless apron carrying the grain directly back therefrom.

A are the fingers by which the grain is gathered from the stubble, and which are attached to the bottom or frame of the platform B, which corresponds with, and may, in fact, be the platform of a harvester. The rear upper parts of the fingers A are curved or inclined upward, to guide the grain to the carrier C of the platform B, and are forked, so that a tooth or knife may enter said fork, to clear the teeth of vines, stalks, or stubble that might lodge in the said fingers. The carrier C passes around a roller, D, pivoted to the forward part of the platform B, and around a roller, E, pivoted to the frame F of the carrier G, that receives the grain from the carrier C of the platform B, and carries it back to the carrier H of the elevator I, by which it is carried up and deposited upon the wagon. These carriers, or such of them as carry the grain up an incline, may have cross-bars attached to them, which may be with or without teeth. To the side boards or frames of the platform B are pivoted two shafts, J, upon which are formed a number of cranks projecting at different angles; but the corresponding cranks of the two shafts should always be parallel with each other. To the corresponding cranks of the shafts J are pivoted bars K, to which are attached pins or teeth L. The forward tooth of each bar K, which enters the fork of the fingers A, is made with a sharp point, and with a sharp edge upon one side of its lower part, and with its other edge dull, forming knives, will cut off and dislodge any vines or stalks that may have lodged in the said fingers A. When not required as knives, they may be reversed, and will then act only as teeth.

A similar set of rakes, J K L, may be connected with the carrier H of the elevator I, to assist in carrying the grain up said elevator.

The platform B is hinged by rods M to the journals of the roller E, or to other supports upon a line with the axis of said roller, so that the said platform may move up and down to adjust itself to uneven ground without affecting the tension of the driving belts or chains.

The carriers C G H and the revolving rakes J K L may be driven from the drive-wheel of the machine by belts, chains, or gear-wheels, as may be desired or convenient.

N is a bail, attached to the forward part of the platform B, to the center of which is attached the end of a rope, O, which passes back over guide-supports P, attached to the frame of the machine, and its other end is designed to be attached to a lever near the driver's seat, so that the driver can readily raise the forward part of the machine from the ground when desired.

The forward part of the platform B is supported upon small wheels Q, the standards R of which are attached adjustably to the said platform, in such positions that the bearing-points of the said wheels may be about upon a line with the points of the fingers A, so that the said fingers may always be supported at the same distance from the ground.

The fingers A should have their points inclined downward, so as to be lower than the plane of the platform, so that the bottom of said platform may be at some distance above the ground when the points of the said fingers are close to it.

Having thus described my invention, I claim as new and desire to secure by Letters Patent—

1. The combination, with fingers A, of the bars K, having a sharp point and edge on forward tooth, as and for the purpose described.

2. The combination, with the cutters and cutter-guards, and an endless apron carrying the grain directly back therefrom, of the reciprocating heads having depending teeth, substantially as and for the purpose specified.

ANDREW CAMPBELL.

Witnesses:
J. H. McLELLAN,
JOHN ADLE.